J. B. Brown,
Wrench.
No. 79,724.   Patented July 7, 1868.
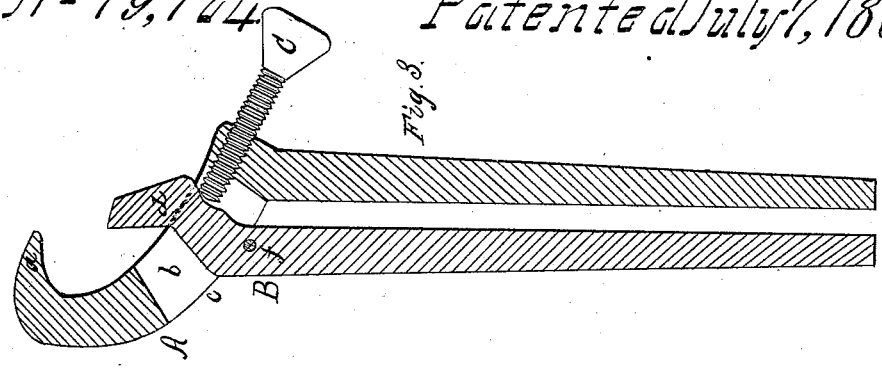
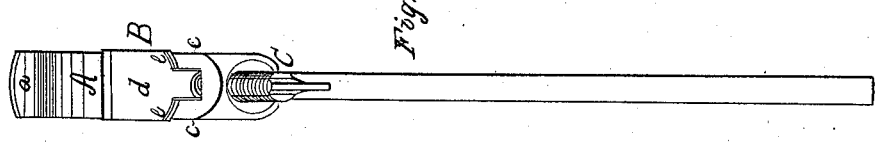
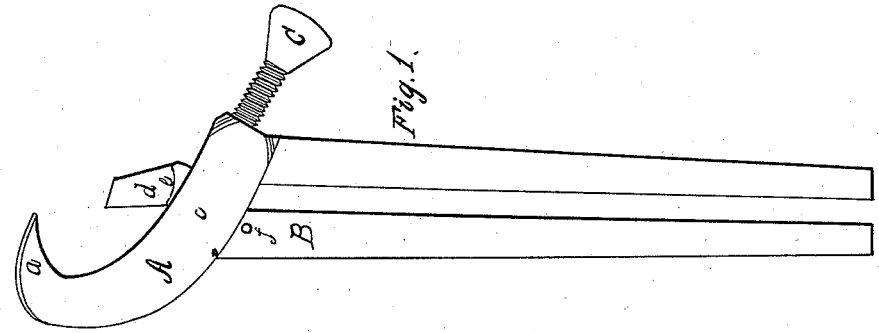
Witnesses.
Inventor
James B. Brown.
by his attorney

United States Patent Office.

JAMES R. BROWN, OF BOSTON, MASSACHUSETTS, ASSIGNOR TO E. H. ASHCROFT, OF SAME PLACE.

Letters Patent No. 79,724, dated July 7, 1868.

IMPROVEMENT IN PIPE-TONGS.

The Schedule referred to in these Letters Patent and making part of the same.

TO ALL PERSONS TO WHOM THESE PRESENTS MAY COME:

Be it known that I, JAMES R. BROWN, of Boston, in the county of Suffolk, and State of Massachusetts, have invented an Improved Pipe-Tongs; and do hereby declare the same to be fully described in the following specification, and represented in the accompanying drawings, of which—

Figure 1 is a side elevation,

Figure 2 an edge view, and

Figure 3 a longitudinal section of them.

My present invention may be said to be an improvement with reference to the pipe-tongs as patented by me, November 30, 1858, and described in the United States patent, No. 22,157.

In my present pipe-tongs I do not employ a centre-pin for the tooth-lever, and thus avoid the danger and annoyance of breakage of such pin.

In constructing my present improved pipe-tongs, I not only make it with the tooth-jaw lever extended through a slot in the hook-jaw lever, and arranged so as to abut against the adjusting-screw extending into such slot, but with the tooth-jaw provided with one or two shoulders, to rest against the hook-jaw lever. I also apply to or combine with the tooth-jaw lever a stud, to keep the said lever in place within the slot of the hook-jaw lever.

In the drawings, A denotes the hook-jaw lever, provided with a hook or claw, a, formed with a slot, b, extending through the shank c thereof. A screw, C, is screwed into the shank and one end of the slot.

The tooth-jaw lever is shown at B as going through the slot b, and provided with a tooth-jaw, d, to extend in one or both directions from the part going through the slot, such being so as to form, at the base of the tooth-jaw, one or two shoulders, e, to bear against the edge of the shank of the hook-jaw lever. A pin or stud, f, is projected from the tooth-jaw lever, near the opposite edge of the said shank, and serves, with the shoulder or shoulders aforesaid, to keep the two jaw-levers in conjunction. By turning up the screw, the tooth-jaw lever may be moved toward the claw or hook-jaw.

I herein make no claim to the subject of the aforesaid patent, my present pipe-tongs being much better fo construction, as well as stronger and less liable to get out of order.

Nor do I claim the extending of one jaw-lever through a slot in the other, and connecting the two by a fulcrum or joint-pin, such being common to many tongs, and seen in the pipe-tongs represented in the patent of P. Herbert, dated August 28, 1866. I wholly dispense with any connection-pin to go through the two levers, such being liable to be easily broken under the great strain to which it is often subjected. I apply to the jaw d the two shoulders e e, to support the jaw, and I use a pin, f, simply to keep the levers together. Furthermore, I arrange the adjusting-screw of the jaw-lever B in line with the two jaws, and to bear against one of them and aid in supporting it; therefore,

I claim as my invention—

The arrangement and combination of the hook-jaw lever A and the tooth-jaw lever B, when constructed as shown and described, and the latter is controlled by its shoulders d, the pin f, and the screw C.

JAMES R. BROWN.

Witnesses:
R. H. EDDY,
F. P. HALE, Jr.